United States Patent
Sasagawa et al.

(10) Patent No.: US 6,524,695 B2
(45) Date of Patent: Feb. 25, 2003

(54) CONDUCTIVE BLADE

(75) Inventors: Gouki Sasagawa, Kanagawa (JP); Tetsuya Nakamura, Tokyo (JP); Masato Ogasawara, Tokyo (JP)

(73) Assignees: Hokushin Corporation, Kanagawa (JP); Toshiba Tec Kabushiki Kaisha, Tokyo (JP); Kabushiki Kaisha Toshiba, Kanagawa (JP)

(*) Notice: Subject to any disclaimer, the term of this patent is extended or adjusted under 35 U.S.C. 154(b) by 0 days.

(21) Appl. No.: 09/788,400

(22) Filed: Feb. 21, 2001

(65) Prior Publication Data

US 2002/0031647 A1 Mar. 14, 2002

(30) Foreign Application Priority Data

Jul. 28, 2000 (JP) ......................... 2000-229836

(51) Int. Cl.[7] .............. B32B 5/02; B32B 5/16; G03G 15/14
(52) U.S. Cl. ................. 428/323; 428/328; 428/332; 399/174
(58) Field of Search ................ 428/323, 328, 428/332; 399/174, 350, 351

(56) References Cited

U.S. PATENT DOCUMENTS 5,839,029 A * 11/1998 Kataoka et al. ............ 399/115

FOREIGN PATENT DOCUMENTS

| JP | 5-241490 | 9/1993 |
| JP | 7-129053 | 5/1995 |
| JP | 9-174742 | 7/1997 |
| JP | 11-013322 | * 4/2000 |

OTHER PUBLICATIONS

Machine Translation of JP-11-013322.*

* cited by examiner

*Primary Examiner*—Stevan A. Resan
*Assistant Examiner*—Nikolas J. Uhlir
(74) *Attorney, Agent, or Firm*—Sughrue Mion, PLLC

(57) ABSTRACT

A conductive blade includes a blade member formed of an electrically conductive rubber, and an electrically conductive holder. The blade member has one widthwise end portion serving as a free end portion and the other widthwise end portion serving as a bonding end portion. One end of the free end portion is brought into contact with a subject member. The holder is bonded to the bonding end portion of the blade member over the length of the blade member. A conductive layer formed of a conducting filler and an elastomer is provided for connecting the end face of the bonding end portion of the blade member and a portion of the holder which is adjacent to the end face of the bonding end portion.

7 Claims, 1 Drawing Sheet

CONDUCTIVE BLADE

BACKGROUND OF THE INVENTION

1. Field of the Invention

The present invention relates to a conductive blade, and more particularly to a conductive blade for establishing charges on, eliminating charges from, or cleaning an electrophotosensitive member, a transfer drum or transfer belt used in a transfer process, an intermediate transport belt, as well as a conductive blade for smoothing charges on, eliminating charges from, or establishing charges on a developing blade used in a developing process, among others.

2. Description of the Related Art

Corona chargers utilizing corona discharge and contact chargers are among the known chargers. In a corona charger, since a high voltage of 4–8 kV must be applied to a wire, the wire and the case that surrounds the wire must be isolated from each other in order to prevent current leakage from the wire to the case. Thus, the corona charger has a drawback because of its large size. Also, since most of the discharged current flows to the case, a high discharge level is required to supply the required amount of current to an electrophotosensitive member. As a result, a large amount of ozone is generated, causing oxidation of the apparatus components and deterioration of the surface of the electrophotosensitive member, with resultant formation of unclear images. Also, such ozone may represent a health hazard.

In view of the drawbacks to corona chargers, contact chargers have been replacing corona chargers.

In contrast to the corona charger, the contact charger can charge, for example, an electrophotosensitive member at low voltage, thereby facilitating the creation of a compact electrostatographic apparatus. The amount of generated ozone is $\frac{1}{10}$ to $\frac{1}{100}$ that of the corona charger. The contact charger is configured as a conductive brush, a single-layer roller, a multi-layer roller, or a blade, among other forms.

In a conductive blade, electrical conduction between a conductive rubber member and a holder must be established, and therefore, an electrically conductive adhesive is conventionally used to connect the rubber member to the holder. However, in such a case, the bonding strength between the rubber and the holder becomes insufficient due to the low bonding strength of the adhesive. In order to solve this drawback, a conductive layer may be provided to establish an electrical connection between the rubber and the holder after they have been connected to each other in a conventional manner.

However, when the conductive layer is extended to cover the free end portion of the conductive rubber member, the length of the free end portion of the conductive blade varies, which changes the state of contact between the conductive blade and an electrophotosensitive member, or causes the rubber member to assume a wave-like form. When the conductive layer is provided on the end portion of the rubber member where the rubber member is bonded to the holder, the rubber member may assume a wave-like form depending on the material of the conductive layer. As a result, it becomes difficult to establish uniform contact between the conductive blade and the electrophotosensitive member.

SUMMARY OF THE INVENTION

In view of the foregoing, an object of the present invention is to provide a conductive blade which can maintain the planarity of a blade member and the size of the free end portion of that member even when a conductive layer for establishing electrical conduction is provided.

In order to achieve the above object, the present invention provides a conductive blade which comprises a blade member formed of an electrically conductive rubber, and an electrically conductive holder. The blade member has one widthwise end portion serving as a free end portion and the other widthwise end portion serving as a bonding end portion. One end of the free end portion is brought into contact with a subject member. The holder is bonded to the bonding end portion of the blade member over the length of the blade member. A conductive layer formed of a conducting filler and an elastomer is provided for connecting the end face of the bonding end portion of the blade member and the portion of the holder which is adjacent to the end face of the bonding end portion.

Preferably, the 300% modulus of the elastomer is 10 Mpa or less.

Preferably, the elastomer has an elongation percentage of 300% or more.

Preferably, the amount of conductive layer is 1 mg or less based on a 1 mm width of the blade member.

Preferably, the conductive layer does not substantially extend onto the front surface of the blade member opposite the bonding surface area of the blade member to which the holder is bonded.

Alternatively, the conductive layer extends onto the front surface of the blade member opposite the bonding surface area of the blade member to which the holder is bonded, and the length of the portion of the conductive layer extending along the front surface is not greater than 30% the length of the bonding surface area as measured in the widthwise direction of the blade member.

Preferably, the end of the conductive layer which is located on the front surface of the blade member is 3 mm or more apart from the edge of the bonding surface area of the blade member, the edge being located on the side of the distal end of the blade member.

In the conductive blade of the present invention, since the conductive layer for connecting the blade member and the holder is formed of a conducting filler and an elastomer, electrical conduction can be established, while the contact characteristics of the blade member remain stable.

DESCRIPTION OF THE PREFERRED EMBODIMENT

Figure 1:
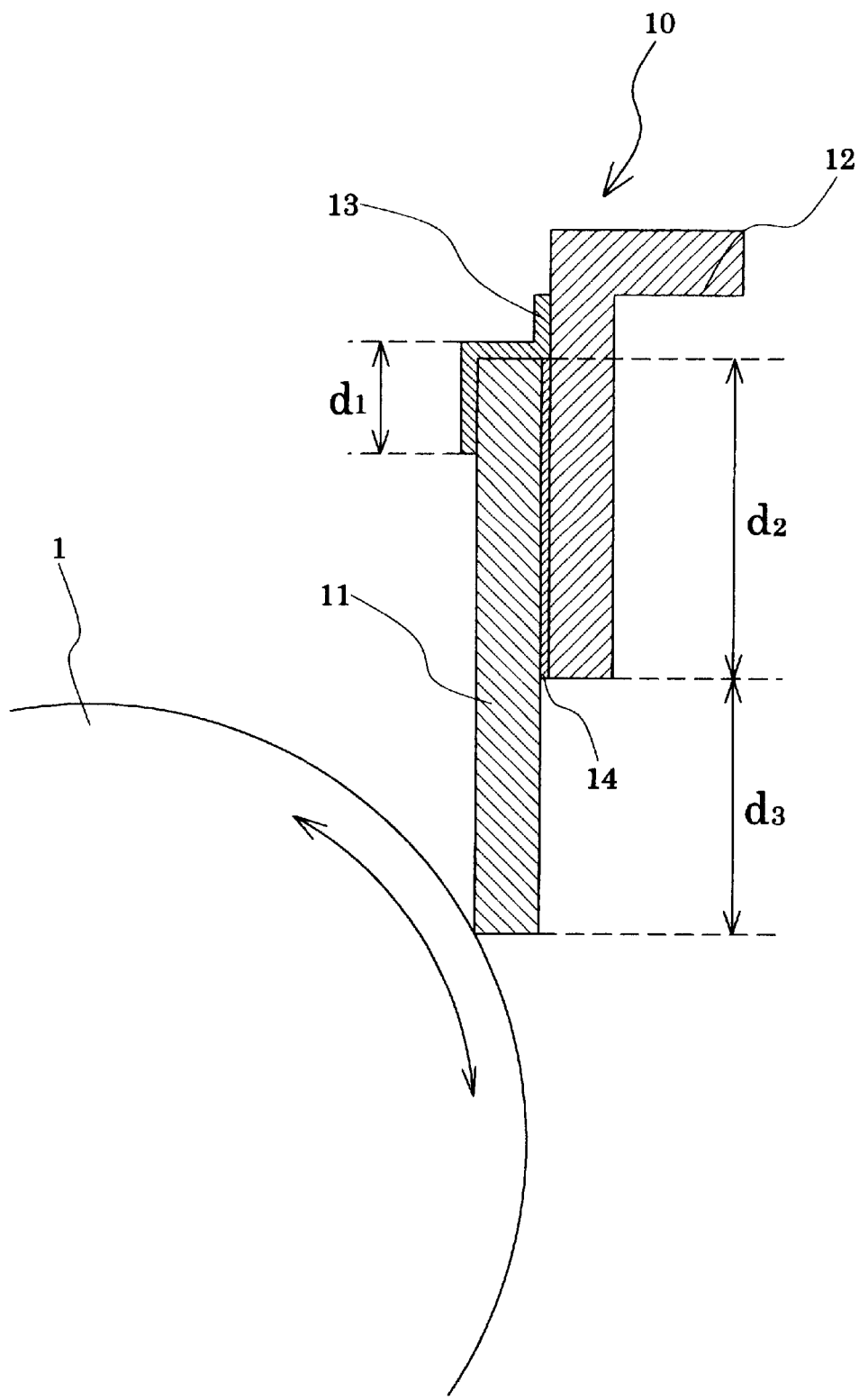
FIG. 1 is a cross-sectional view of a conductive blade according to the present invention.

FIG. 1 shows an embodiment of the conductive blade of present invention.

As shown in FIG. 1, a conductive blade 10 comprises a blade member 11 having a thin-plate shape and a holder 12. One widthwise end portion of the blade member 11 serves as a free end portion, and the other widthwise end portion of the blade member 11 serves as a bonding end portion. The holder 12 holds the bonding end portion of the blade member 11. The blade member 11 and the holder 12 are bonded to each other by an adhesive layer 14 extending over substantially the entire length of the blade member 11. A conductive layer 13 is provided to establish an electrical connection between the end face of the bonding end portion of the blade member 11 and the portion of the holder 12 which is adjacent to the end face of the bonding end portion.

The conductive layer 13 is formed of an elastomer in which conducting filler is dispersed. The conductive layer 13 covers the end face of the bonding end portion of the blade member 11 as well as the front surface of the bonding end portion opposite the bonding surface of the blade member 11 to which the holder 12 is bonded. The conductive layer 13 extends to the portion of the holder 12 adjacent to the end face of the bonding end portion.

In the present invention, since the conductive layer 13, which is employed for electrically connecting the blade member 11 to the holder 12, contains elastomer as a binder and therefore is expandable, the blade member 11 is not warped due to pulling forces generated by the conductive layer 13.

In order to prevent warpage of the blade member 11, the conductive layer 13 is preferably formed of an elastomer whose 300% modulus is 100 MPa or less.

For example, the elastomer may be a thermoplastic elastomer (trade name: Desmocoll 406).

The amount of material applied to form the conductive layer 13 is preferably 1 mg or less per unit width (1 mm) of the blade member 11. This is because when the conductive layer 13 is excessively thick, the pulling force acting on the blade member 11 increases accordingly, resulting in the generation of warpage of the blade member 11. In addition, the extension length $d_1$ of the portion of the conductive layer 13 on the front surface of the blade member 11 is preferably not greater than 30% the length $d_2$ of the bonding surface area through which the holder 12 is bonded to the blade member 11, as measured in the widthwise direction of the blade member 11. Preferably, the extension length $d_1$ is substantially zero. When the extension length $d_1$ is in excess of 30% the length $d_2$ of the bonding surface area the blade member 11 may warp or assume a wave-like shape.

The conducting filler employed in the conductive layer 13 is not particularly limited so long as it conducts electricity. Examples of such a conducting filler include carbon black and metallic powder. Particularly, carbon black is relatively inexpensive and allows for the easy formation of a three-dimensional structure. Moreover, carbon black can develop electrical conductivity when present in a smaller amount than metallic powder. Also, the electrical conductivity of carbon black is less sensitive to temperature and humidity. The type of carbon black is not particularly limited. Specific examples of carbon black include KETJEN BLACK (trade name, product of Lion Corp.) and TOKA BLACK #5500 (trade name, product of Tokai Carbon Co., Ltd.).

When the conductive layer is provided for electrically connecting the blade member 11 to the holder 12, it is not preferable to provide the conductive layer so as to extend onto the free end portion of the blade member 11. That is, the extended conductive layer changes the length $d_3$ of the free end portion of the blade member 11, resulting in changes in the contact characteristics of the blade member 11.

The blade member 11 is formed of a conductive rubber material. As in the case of the conductive layer 13, any conducting filler can be used for the conductive rubber member so long as it has electrical conductivity and is insoluble in a polymer base material, such as rubber material. Examples of such conducting filler include carbon black and metallic powder.

Many rubber materials contain a plasticizer. Accordingly, when such a rubber material is left in contact with a subject member, the subject member may be contaminated with the plasticizer. Therefore, in the case where the subject member is an electrophotosensitive member, polyurethane or silicone rubber is preferred as a polymeric base material. However, silicone rubber has a drawback in that an oligomer may gradually ooze out. From this point of view, polyurethane is most preferred.

Among polyurethane materials, injection-moldable liquid polyurethane is particularly preferred. Such polyurethane can be obtained through thermally curing a mixture of high-molecular-weight polyol, an isocyanate compound, a chain extender, and a cross-linking agent, among others. Examples of polyols include polyester polyol, polycarbonate polyol, polyether polyol, and polycarbonate ether polyol. Examples of isocyanate compounds include 4,4'-diphenylmethane diisocyanate (MDI), 2,6-toluene diisocyanate (TDI), 1,5-naphthalene diisocyanate (NDI), and p-phenylene diisocyanate (PPDI). Examples of a chain extender include polyalcohols such as butanediol, ethylene glycol, trimethylolpropane, and glycerin. Examples of cross-linking agents include aromatic diamine cross-linking agents.

The holder 12 which is bonded to the blade member 11 is formed of a conductive material, such as metal. The adhesive layer 14 may be formed of a generally used adhesive, because the layer 14 is not required to have electrical conductivity.

Since the conductive blade of the present invention includes the conductive layer, good electrical conduction can be established between a power supply and the free distal end of the blade member which is brought into contact with the subject member, whereby the conductive blade can function sufficiently to establish charges on or eliminate charges from an electrophotosensitive member.

The conductive blade 10 comprises the blade member 11 such that the free end portion of the blade member 11 is brought into contact with an electrophotosensitive member 1. No particular limitation is imposed on the way in which the blade member 11 forms contact, and the blade member 11 may abut the electrophotosensitive member 1 in trail contact in which the electrophotosensitive member 1 rotates clockwise or against contact in which the electrophotosensitive member 1 rotates counterclockwise.

EXAMPLES

The present invention will next be described in detail by way of examples, which should not be construed as limiting the invention thereto.

Example 1:

A urethane prepolymer was melted through the application of heat, and then the melt, 1,4-butanediol, and trimethylolpropane were mixed in predetermined proportions. The resultant mixture was injected into a pre-heated metallic mold, and then cured through the application of heat. After molding was complete, the resultant rubber elastomer was cut into pieces, to thereby prepare a blade member having a width of 15 mm, a thickness of 2.0 mm, and a length of 310 mm. Separately, a metallic plate was cut to a predetermined size, to thereby prepare a holder. The holder was bonded, by use of an adhesive, to the bonding end portion of the blade member over the length of the blade member. The length $d_2$ of the bonding surface area (shown in FIG. 1) between the blade member and the holder was 5 mm. The adhesive employed was a general adhesive not having electrical conductivity.

Separately, KETJEN BLACK ECP serving as a conducting filler (2.5 parts by weight), a thermoplastic elastomer (trade name: Desmocoll 406) (10.0 parts by weight), and a solvent (ethyl acetate) (87.5 parts by weight) were mixed.

The resultant mixture was applied onto the blade member and the holder, to thereby form a conductive layer.

The properties of Desmocoll 406 are shown in Table 1. The properties were measured in accordance with DIN 53504. The measurement was performed by use of a dumbbell S2 at a pulling speed of 200 mm/min.

TABLE 1

| | Properties | | | |
|---|---|---|---|---|
| | 100% modulus (Mpa) | 300% modulus (Mpa) | Tensile strength (Mpa) | Elongation percentage (%) |
| Desmocoll 406 | 3.038 | 3.332 | 29.694 | 665 |

As shown in Table 1, Desmocoll 406 has a 300% modulus of 3.332 Mpa and an elongation percentage of 665%.

The conductive layer was provided so as to connect the end face of the bonding end portion of the blade member and a portion of the holder adjacent to the end face, thereby establishing electrical conduction between the blade member and the holder. In Example 1, the extension length $d_1$ (shown in FIG. 1) of the conductive layer on the front surface of the blade member was 1 mm. The amount of the conductive layer applied onto the blade member was 1 mg per unit width (1 mm) of the blade member.

Comparative Examples 1 and 2:

As Comparative Examples 1 and 2, there were fabricated conductive blades having the same structure as that of the conductive blade of Example 1, except that the extension length $d_1$ of the conductive layer was set to 2 mm in the conductive blade of Comparative Example 1, and the extension length $d_1$ of the conductive layer was set to 3 mm in the conductive blade of Comparative Example 2.

Test Example 1:

Five conductive blades were produced for each of Example 1 and Comparative Examples 1 and 2, and each conductive blade was visually observed to determine the degree of waviness of the blade member. The results of the observation are shown in Table 2.

TABLE 2

| | Extension length $d_1$ (mm) | Status |
|---|---|---|
| Example 1 | 1 mm (20%) | No waviness observed in blade members |
| Comparative Example 1 | 2 mm (40%) | Waviness observed in some blade members |
| Comparative Example 2 | 3 mm (60%) | Waviness observed in almost all blade members |

The results reveal that no waviness was observed in the conductive blade in which the extension length $d_1$ was set to 1 mm. Accordingly, the extension length $d_1$ of the conductive layer is preferably 30% or less of the length $d_2$ of the bonding surface area.

Example 2:

There was fabricated a conductive blade having the same structure as that of the conductive blade of Example 1, except that the extension length $d_1$ of the conductive layer was set to 1 mm or less (i.e.; the extension length $d_1$ was substantially zero).

Comparative Example 3:

There was fabricated a conductive blade having the same structure as that of the conductive blade of Example 2, except that a thermosetting resin was employed in the conductive layer instead of the thermoplastic elastomer. Specifically, a mixture of Conap AD1146 (15.0 parts by weight), Ketjen Black ECP (5.0 parts by weight), and a solvent (e.g., IPA, toluene, or ethanol) (80.0 parts by weight) were employed for forming the conductive layer.

Test Example 2:

For the conductive blades of Example 2 and Comparative Example 3, the rate of change in the length of the free end portion due to formation of the conductive layer was measured at five points in the longitudinal direction of the blade member. The results are shown in Table 3.

TABLE 3

| | Change in length of free end portion (measured at five points) | | | | |
|---|---|---|---|---|---|
| Example 2 | 0.05 | 0.05 | 0.04 | 0.03 | 0.04 |
| Comparative Example 3 | 0.12 | 0.11 | 0.17 | 0.16 | 0.11 |

The results reveal that little change in the length of the free end portion of the blade member was observed in the conductive blade of Example 2 in which the conductive layer was formed of elastomer; and that considerable change in the length of the free end portion of the blade member was observed in the conductive blade of Comparative Example 3 in which the conductive layer was formed of thermosetting resin. In the conductive blade of Comparative Example 3, changes in the length of the free end portion were caused by the pulling force generated by the thermosetting resin.

As described above, in the conductive blade of the present invention, a conductive layer formed of a conducting filler and an elastomer is provided for connecting the end face of the bonding end portion of the blade member and a portion of the holder which is adjacent to the end face of the bonding end portion. Therefore, electrical conduction between the blade member and the holder can be established, while any deterioration in contact characteristics of the blade member and the generation of waviness in the blade member are prevented. Particularly, when the 300% modulus of the elastomer employed in the conductive layer is 10 Mpa or less; the amount of conductive layer substance per unit width (1 mm) of the blade member is 1 mg; and the extension length $d_1$ of the conductive layer on the front surface of the blade member is 30% the length of the bonding surface area between the holder and the blade member, any deterioration in contact characteristics of the blade member and the generation of waviness in the blade member are more reliably prevented.

What is claimed is:

1. A conductive blade comprising:
   a blade member formed of an electrically conductive rubber, one widthwise end portion of the blade member serving as a free end portion to be brought into contact with a subject member and the other widthwise end portion of the blade member serving as a bonding end portion;
   a holder bonded to the bonding end portion of the blade member over the length of the blade member; and
   a conductive layer formed of a conducting filler and an elastomer, the conductive layer being provided for connecting the end face of the bonding end portion of the blade member and a portion of the holder which is adjacent to the end face of the bonding end portion.

2. A conductive blade according to claim 1, wherein a 300% modulus of the elastomer is 10 MPa or less.

3. A conductive blade according to claim 1, wherein the elastomer has an elongation percentage of 300% or more.

4. A conductive blade according to claim 1, wherein the amount of the conductive layer is 1 mg or less on the basis of a 1 mm width of the blade member.

5. A conductive blade according to claim 1, wherein the conductive layer does not substantially extend onto a front surface of the blade member opposite a bonding surface area of the blade member to which the holder is bonded.

6. A conductive blade according to claim 1, wherein the conductive layer extends onto a front surface of the blade member opposite a bonding surface area of the blade member to which the holder is bonded, and the length of a portion of the conductive layer extending along the front surface is not greater than 30% the length of the bonding surface area as measured in the widthwise direction of the blade member.

7. A conductive blade according to claim 6, wherein the end of the conductive layer which is located on the front surface of the blade member is 3 mm or more apart from an edge of the bonding surface area of the blade member, the edge being located on the side of the distal end of the blade member.

* * * * *